Dec. 27, 1966 — E. A. LINK — 3,293,676

INSTRUMENT CAPSULE

Filed Jan. 2, 1964 — 3 Sheets-Sheet 1

EDWIN A. LINK
INVENTOR

BY
ATTORNEY

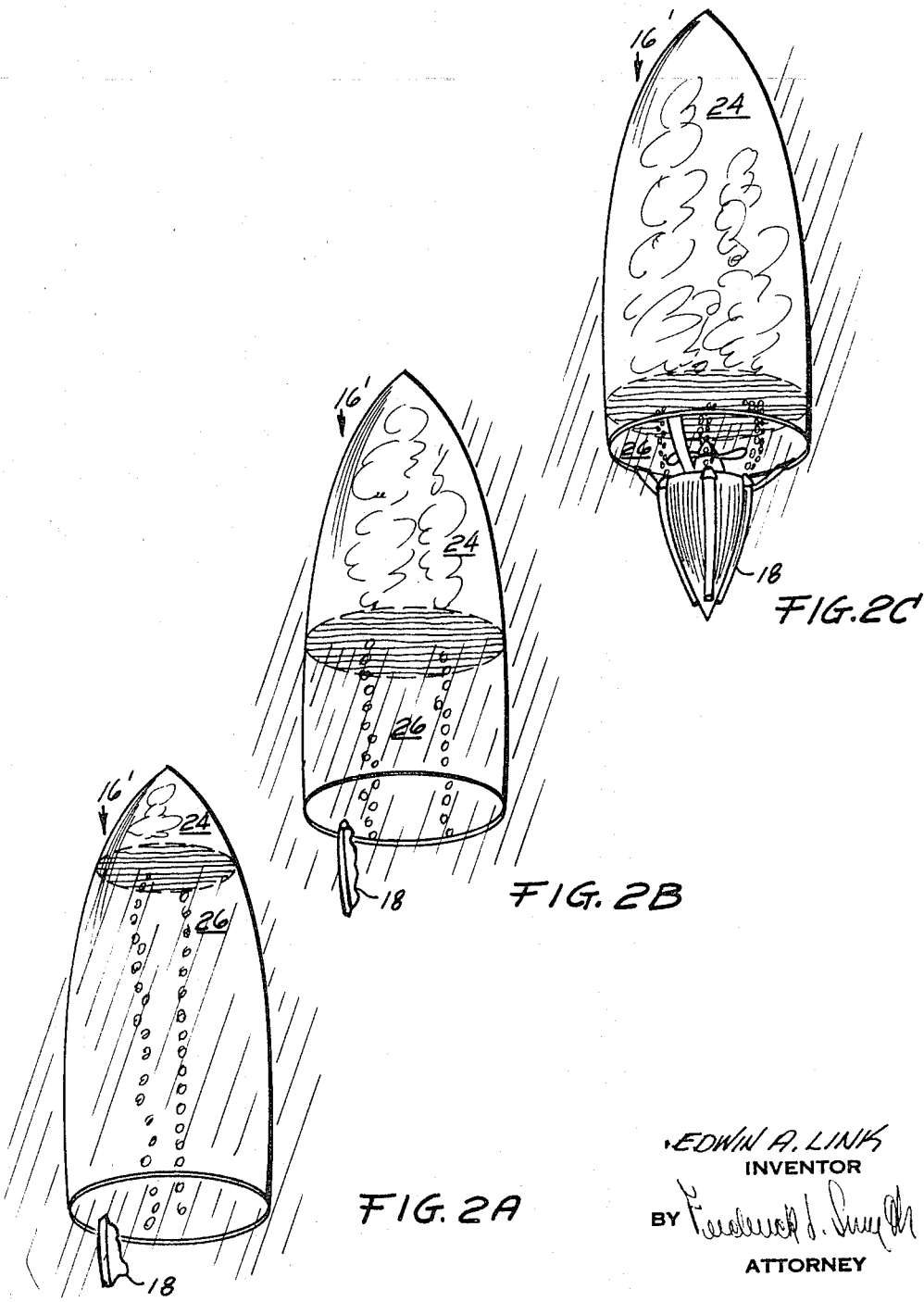

Dec. 27, 1966   E. A. LINK   3,293,676
INSTRUMENT CAPSULE
Filed Jan. 2, 1964   3 Sheets-Sheet 3

EDWIN A. LINK
INVENTOR
BY
ATTORNEY

United States Patent Office 3,293,676
Patented Dec. 27, 1966

3,293,676
INSTRUMENT CAPSULE
Edwin A. Link, Binghamton, N.Y., assignor, by mesne assignments, to Ocean Systems, Inc., New York, N.Y., a corporation of New York
Filed Jan. 2, 1964, Ser. No. 335,212
3 Claims. (Cl. 9—8)

This invention relates to an instrument capsule and more particularly to an instrument capsule operable to be driven to extreme depths in the sea and, further, to be selectively recovered therefrom.

It is well known in the art of undersea measurements to provide an instrumentated capsule to monitor and/or record various undersea data and to recover such capsules. Generally, such capsules are, themselves, characterized by a weight sufficient to sink to a desired depth, and, further, apparatus is included therein, which is selectively operable to provide a lifting force sufficient to return the capsule to the surface of the sea.

Generally, such devices, as shown by the prior art, normally include either a gas generator, or a supply of compressed gas such as air or carbon dioxide, which, in response to a pressure actuated or an explosive device, supplies an expanded volume of gas to the capsule. Thus, the gas generator or compressed gas supply, is automatically rendered operative to supply the necessary buoyancy to the capsule. Additionally, a large number of similar devices have also been employed to supply buoyancy to sunken objects, by attaching one or more of such capsules to the object to be raised. Next, the buoyancy, selectively imparted to the capsules, is sufficient, not only to raise the capsules, but also to raise the object to which they are attached. However, although the above briefly described capsules have been effective in shallow, or even at medium, depths, such capsules have not been operative, until now, at extreme depths which may exceed, by way of example, 30,000 feet.

According to the invention, there is provided an improved instrument capsule, that, not only can be maneuvered to depths of 30,000 feet or more, but, further, may be recovered therefrom. It should be understood that the apparatus provided by the invention differs markedly from the apparatuses of the prior art, which can readily be seen from a comparison of the conditions encountered at medium depths of approximately 400 feet, with the conditions existing at 30,000 feet. By way of example, the pressure at a depth of 30,000 feet exceeds 700 atmospheres. At pressures of this magnitude, conventional buoyancy gases, such as carbon dioxide, condense to the liquid state and thereby provide no net buoyancy to the capsule to be recovered. The instrument capsule of the present invention, however, includes one or more novel hydrogen generators to selectively provide the required overall net buoyancy to the capsule, even at these extreme depths. As more specifically hereinafter described, with respect to several preferred embodiments of the invention, lithium hydrid or sodium are each separately employed in novel hydrogen generators to provide the necessary buoyancy at any desired depth. Further, the capsule of the invention includes one or more packets, external thereto, each containing the novel hydrogen generator, which, upon command, provides a sufficient quantity of hydrogen to the interior of the capsule, sufficient to return it to surface. It should be understood that, initially, the generated hydrogen is at a pressure of about 700 atmospheres, and, as a result of the linear decrease in the external water pressure as the capsule ascends toward the surface of the water, this initial gas pressure must also be linearly reduced. This feature is automatically accomplished in the design of the present capsule, wherein the lower extremity of the capsule is open to the surrounding water. Normally, the entire interior volume of the capsule is filled with water. When the capsule is to be raised, a portion of the water is replaced by the generated gas to provide the necessary buoyancy, and, as the surrounding water pressure decreases as the capsule ascends, the higher initial pressure of the gas is bled off through the lower opening of the capsule to automatically reduce the gas pressure within the capsule, and thereby maintain this pressure equal to the surrounding water pressure.

Briefly, this device is a flexible capsule which carries instruments to extreme depths in the sea. It should be noted that it is important to have such capsules sink quickly, and thereafter also return quickly to the surface, in order to minimize the effect of underwater currents, and, moreover, it is highly desirable not to employ one or more cables to obtain the above-listed features, since the weight of such cables becomes excessive when extreme depths are to be explored. As indicated above, the capsule of the present invention does not include or require any cables, rather, the capsule includes one or more selectively operable novel hydrogen generators. After the capsule has sunk to the desired depth and the measurements have been taken by automatic equipment, the hydrogen generator, or generators, are activated by an explosive charge attached to the capsule in response to a specific encoded sonic signal selectively delivered from a mother ship on the surface of the water, and the capsule then begins to rise. The opening in the bottom of the capsule automatically regulates the gas pressure, and sufficient gas escapes as the capsule rises to prevent the capsule from rupturing. Further, the opening allows excess gas to escape, should the gas generator supply hydrogen in an amount greater than necessary. If desired, an electric motor, powered by a battery and connected to a propeller external to the capsule, may initially be employed to propel the capsule toward the bottom of the sea faster than it would ordinarily sink by itself.

It is an object of the invention, therefore, to provide an improved instrument capsule.

Another object of the invention is to provide an instrument capsule capable of obtaining measurements at extreme depths in the sea and thereafter to selectively be returned to the surface.

A limited object of the invention is to provide an improved hydrogen generator operable in environments of extreme external pressures.

Still another object of the invention is to provide an improved instrument capsule including one or more novel gas generators selectively operable at extreme depths to raise the capsule to the surface wherein automatic adjustments are included to compensate for the pressure changes as the capsule is raised from the extreme depths to the surface.

Yet another object of the invention is to provide an improved instrument capsule for taking underwater measurements including gas generator apparatuses associated therewith whereby, as may be necessary, a sufficient supply of gas can be generated to return the capsule to the surface.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIGS. 2A through 2C illustrate the operation of the automatic pressure adjustment within the buoyancy portion of the capsule of the invention during the return of the capsule to the surface.

Figures 1, 1A:
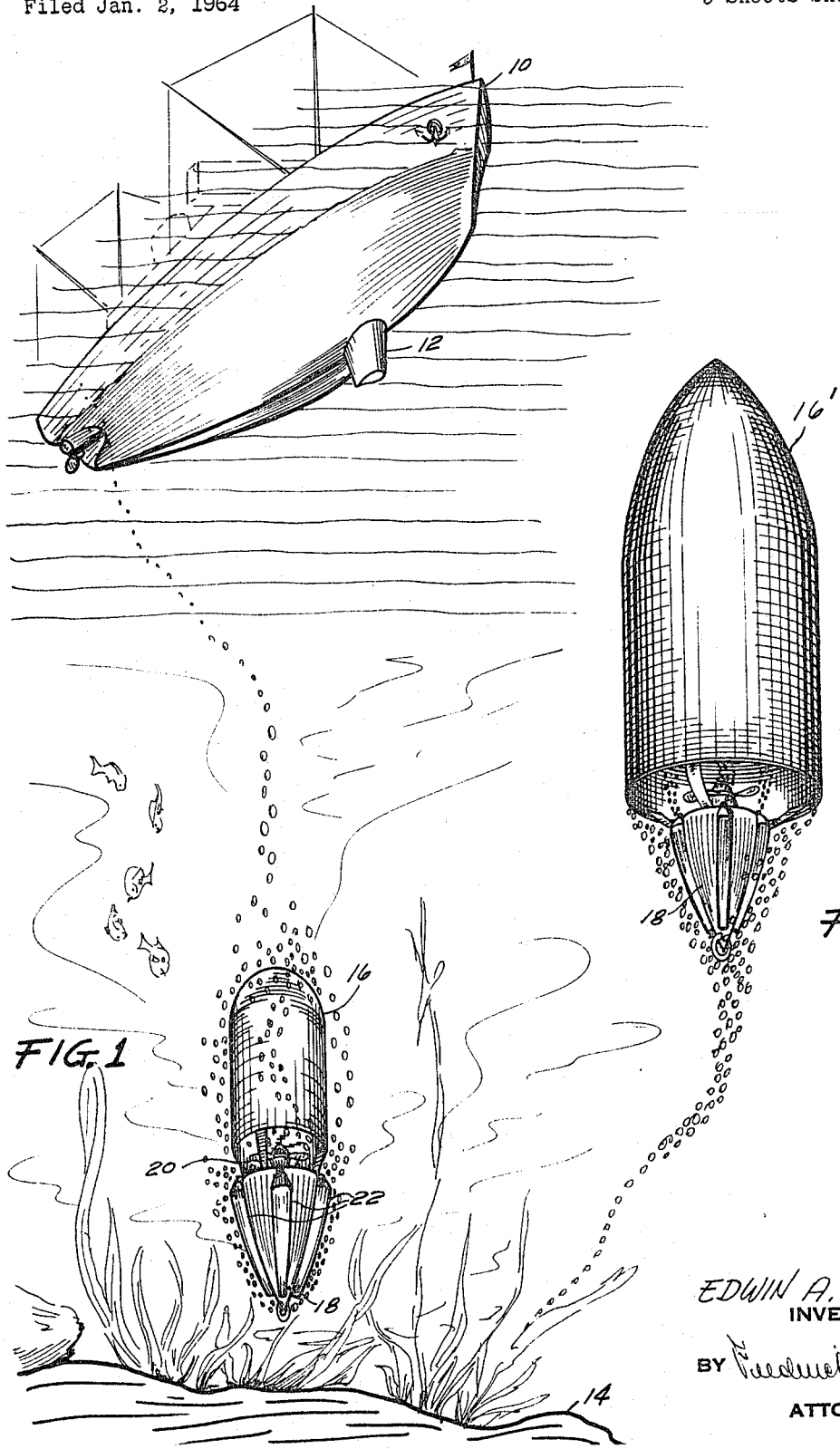
FIG. 1 is a diagrammatic view showing a preferred embodiment of the instrument capsule of the invention lowered from a tender.
FIG. 1A is a diagrammatic view of the instrument capsule of FIG. 1 returning to the surface.

Before describing the instrument capsule of the invention in detail, it is believed pertinent to first discuss several of the problems inherent in submerging an instrument capsule to extreme ocean depths and thereafter recovering the capsule. It will be understood, of course, that consideration cannot be given to include a supply of compressed air or other gas in the capsule, since the pressures encountered at such extreme depths necessitate the inclusion within the capsule of a container sufficient to retain the gas supply at a pressure at least equal to the maximum pressure to be encountered by the capsule. Such a container would exhibit such an exhorbitant amount of weight that the supply of gas retained therein would be insufficient to raise the container, let alone to supply additional buoyancy to the instrument capsule.

As a specific example, assume that it is required to lift an intsrument capsule of 100 lbs., underwater-weight, from the bottom of the ocean, which may be 30,000 feet or more, to the surface in an hour or less. In order to accomplish this by the buoyancy method, the amount of water to be displaced depends upon the density of the buoyancy material at a pressure of about 700 atmospheres. Hydrogen weighs approximately 42 grams per liter at this pressure, while such gases as nitrogen, oxygen and carbon monoxide weigh between 525 and 575 grams per liter. Since the weight of sea water at these pressures is about 1060 grams per liter, it requires about 45 liters (4 lbs.) of hydrogen or 90 liters (100 lbs.) of the heavier gases, to just support the 100 lbs. weight. For this reason, the selection of hydrogen is particularly attractive since the weight of gas required is negligible compared to the load. A small volume of hydrogen, that is 1½ cubic feet versus at least 3 cubic feet for the heavier gases, also aids in easing the design problems of the capsule by lowering the drag and capsule weight.

The amount of excess lift required to raise the load at a rate of 5 miles per hour depends, of course, upon the shape of the combined load and the buoyant package, for the reason that the major volume resides in the capsule. The amount of excess lift is determined in the design of the inflated capsule being returned to the surface. The displacement required to give the necessary velocity is about 150% of the total weight of the system herein being considered.

The use of normal burning reagents, such as hitherto employed with the usual propellants, is not practical when extreme depths are under consideration, since the major products generated are water and carbon dioxide, the latter of which condenses at these pressures and therefore results in no net lift. There are available special oxidizer fuel mixtures which produce mainly carbon dioxide and nitrogen. However, these systems contain a large fraction of the condensible materials making the net original weight requirement in excess of 500 lbs., in order to form 100 lbs. of nitrogen and/or carbon monoxide products. Because of the obvious disadvantages of such large masses, they will not be hereinafter considered for use in an instrument capsule capable of being submerged to extreme depths.

Therefore, one or more novel hydrogen generators is incorporated together with the capsule in order to minimize the weight of the overall system. Keeping in mind that the capsule of the invention is designed to work at depths in excess of 30,000 feet, it being understood that the capsule is likewise operable in shallow depths, two basic generators will next be described, the first of which exhibits extreme simplicity and the second is characterized by increased reliability. The two hydrogen generation materials selected for use in the novel generators are lithium hydrid and sodium. Lithium hydrid is relatively easy to work with and allows a small initial weight of the generator, while sodium offers a lower cost generator, but with the related problems in the design of a container to contain and control the cold flow properties of the sodium.

The general method of operation of each of the hydrogen generators is to seal the reactants in a container, which, in a first embodiment of the invention, is suspended below the capsule. As will be better understood as the description proceeds, the entire internal volume of the capsule is initially filled with water. When the desired depth and measurements have been obtained, a pyrotechnic device opens a portion of the container to sea water, and permits the reagents to react with the surrounding water, thereby forming gaseous hydrogen. The generated hydrogen then enters the capsule and expels a portion of the water and any other products of the reaction which may also enter the capsule. This design minimizes the necessity of any extraneous hardware being added to the payload and yields a relatively simple, yet highly reliable design. The capsule material is preferably butyl rubber which exhibits excellent resistance to hot caustic and is readily prepared and moulded to the desired filled shape, thereby being effective to minimize drag during the descent. Next, two generator configurations are discussed, each of which differs only in the choice of the positioning of the reacting area of the generator cylinders with respect to the capsule. The first generator includes a top cover which is selectively removed from the cylinder by means of a pyrotechnic device, or the like, so that the water comes in contact with the end of the reactant, which is then consumed endwise, as by way of example, in a manner similar to that of a burning cigarette. In the second design, the cylinder includes an internal axial channel which is lined with a perforated steel sleeve capable of withstanding the external pressure. This channel is sealed until it is desired to start the reaction. At this time, explosive valves at the ends of the channel are actuated to open it to the water. This embodiment of the novel gas generator inherently provides for good circulation of the water past the reactant and draws the generated hydrogen into the balloon.

Lithium hydrid reacts with water according to the equation:

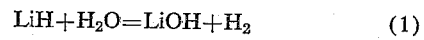

$$LiH + H_2O = LiOH + H_2 \qquad (1)$$

From Equation 1 it can be seen that 8 lbs. of lithium hydrid reacts with 18 lbs. of water to form 2 lbs. of gaseous hydrogen. Since it requires about 4 lbs. of hydrogen to lift a weight of 100 lbs., approximately 16 lbs. of lithium hydrid, occupying a volume of about 0.4 cubic feet, are required.

When sodium is employed, the corresponding reaction is:

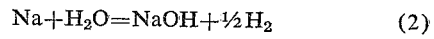

$$Na + H_2O = NaOH + \tfrac{1}{2}H_2 \qquad (2)$$

From Equation 2, therefore, 23 lbs. of sodium are required to produce one lb. of gaseous hydrogen, resulting in that 92 lbs. of sodium are required to provide 100 lbs. of lift. Since the density of sodium is about unity, approximately 1½ cubic feet must be reserved in the system to hold the required amount of sodium.

In the system now being described, the underwater survey package is released by a mother ship and sinks to the bottom with no cable attachment of any form. Further, as will be more particularly hereinafter described, a propeller or other means are generally employed to impell the capsule towards the seabottom at a rate greater than that which would be obtained by the capsule itself. Return to the surface is initiated in response to a sonic command from the mother ship. Alternatively, automatic pressure-sensing devices may be incorporated into the capsule to initiate the hydrogen generators, at a selected time after a predetermined depth has been attained. In general, when a sonic command is employed, the "command-to-surface" signal is frequency coded to minimize the chance that any undersea noises may inadvertently cause an uncommanded return to the surface.

The command to surface signal consists of four or more single frequency tones emitted by sonar gear housed in the mother ship. These tones are detected and decoded by an underwater sound transducer on the instrument package. By way of example, the detected signal is first amplified, and then applied to four frequency selection filters in parallel, each filter discriminating against all frequencies except that to which it is tuned. Each filter output is coupled to an amplifier-rectifier operable to actuate an associated relay. The contacts of the 4 relays are connected in a conventional series logic circuit such that when all 4 signal frequencies are present simultaneously, a hot wire igniter, in series with the relay contacts, operates to ignite an explosive charge which removes the sealing cap of the flowtation gas generator. A generating unit aboard the mother ship provies the 4 signal frequencies required, which frequencies are then combined and injected into the ship's sonar system. It should be understood that obviously various other frequency and coding signals may be employed as desired.

Referring now to the drawings, FIG. 1 illustrates a simplified diagrammatical view of the operation of the system. As shown, a mother ship 10, including a sonar generator 12, is positioned at a predetermined depth above the sea bottom 14, at which the selected measurements are to be taken. Also shown in FIG. 1, is an instrument capsule 16 which, in general, is normally opened to the sea water. Capsule 16 contains the selected measuring instruments, which may be thermometers, cameras, densiometers, salinometers, and the like. Secured to the lower portion of capsule 16 is an auxiliary section 18, which includes a sonic detector and other devices which may be released from the capsule before it returns to the surface. Attached to the upper portion of section 18 is a propeller 20 which is employed to impell capsule 16 toward the ocean bottom 14, when it is desired that the capsule descend at an accelerated rate. Alternatively, of course, propeller 20 could be attached to the upper portion of capsule 16. Further secured to section 18 are a number of hydrogen generators 22.

In operation, capsule 16 and section 18 are jettisoned from ship 10, and rapidly descend toward ocean bottom 14 as a result of both its weight and the action of propeller 20. At this time, capsule 16 is normally filled with sea water at a pressure equal to the surrounding pressure. It should be understood that since the capsule is designed to enter depths in excess of 30,000 feet, the instruments contained within the capsule must be constructed to withstand and operate at pressures of about 1100 p.s.i. If desired, an anchor may be incorporated with the system to maintain the capsule near the ocean bottom for an extended period of time.

When it is desired to return the system to the surface, a preselected signal is transmitted by sonar 12, which is detected and decoded by section 18 in the manner outlined above. Upon receipt of the predetermined signal by section 18, the top and/or bottom and caps of hydrogen generators 22 are exploded away and the water contacting the selected reagent, that is, lithium hydrid or sodium, results in the formation of hydrogen in accordance with either Equation 1 or Equation 2 above. The generated hydrogen then enters the confines of capsule 16 and exhibits a pressure sufficient to remove a portion of the water therefrom, thereby rendering the system buoyant. Further, the explosive device is operable to disengage the anchor, if such is employed, and, further, may additionally be effective to detach auxiliary section 18 from capsule 16 after the hydrogen has been generated, in order to reduce the net amount of weight being returned to the surface. As indicated in FIG. 1A, the now inflated capsule 16' has a sufficient net buoyancy to return to the surface. Although section 18 is shown attached to capsule 16' during the ascent, this can be detached, if desired, as explained above.

As hereinabove stated, the pressure at the working depth of the capsule is in the order of 1100 p.s.i., while at a depth of only 30 feet, by way of example, the pressure is reduced to about 125 p.s.i. In order to accommodate this wide range of pressure, reference should now be made to FIGS. 2A through 2C, which indicates the self-compensating operation of capsule 16. FIG. 2A illustrates the interior of capsule 16 immediately after the hydrogen has been generated. As there shown, as a result of the extreme magnitude of pressure, the hydrogen is confined within a limited portion 24 of the capsule, the remaining portion 26 remaining filled with water. As the capsule rises and reaches an intermediate depth, such as indicated in FIG. 2B, the hydrogen has expanded so that region 24 occupies essentially ½ of capsule 16'. Further, it should be understood that any excess pressure is eliminated through the bottom opening of capsule 16', thereby maintaining the pressure of hydrogen equal to the pressure of the surrounding water. Finally, as the capsule nears the surface, as can be seen from FIG. 2C, the region 24 now occupies essentially the entire region of capsule 16'. In this manner, as capsule 16' ascends to the surface, any excess hydrogen pressure inside the capsule escapes through the bottom opening as the water pressure decreases, and it is this action that automatically reduces the pressure as the capsule ascends.

Figure 3:
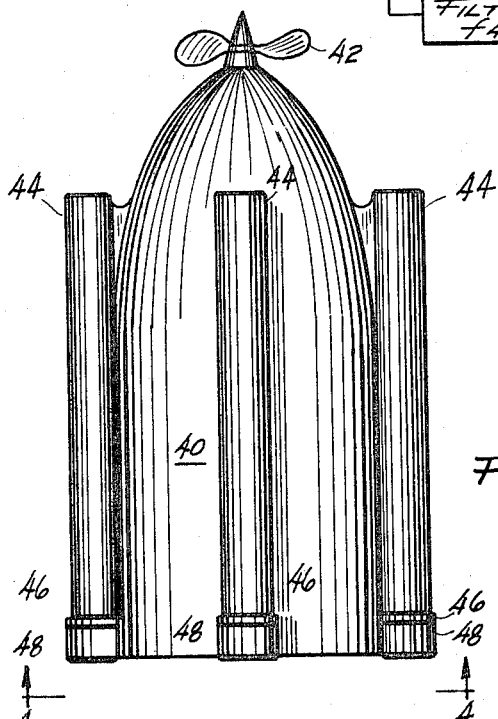
FIG. 3 is a view of another preferred embodiment of the capsule of the invention illustrating the arrangement of the gas generators associated therewith.

An alternate embodiment of the capsule of the invention is illustrated in FIG. 3. As there shown, the primary capsule portion 40 houses the desired measurement instruments together with the motive power to operate the propeller 42. Rather than suspending one or more hydrogen generators below the capsule, a number of generators 44 are secured to the longitudinal side regions of the capsule. Again, as in the previously described embodiment, the bottom of the capsule is open to allow sea water to enter into and flood the capsule. The lower portion of each of the separate hydrogen generators is provided with an explosive seal 46, each of which is operable to selectively provide a source of buoyant hydrogen gas in the manner above described; each of the generators 44 including a supply of lithium hydrid or sodium. Further, it is generally desirable to attach one or more weights 48 to each of the explosive members in order that the capsule vertically descend during the operation of propeller 42 at a rapid rate.

As before, the capsule is immersed in the sea in such a manner that the inner volume of capsule 40 is completely inundated with water, and then allowed to progress towards the sea bottom. After the capsule has remained at the bottom for a sufficient period of time to monitor and/or record the desired measurements, an encoded sonic signal is directed toward the detector contained within the capsule 40, the output of which is thereupon effective to explosively remove each of the securing members 46 and weights 48 to initiate the generation of hydrogen gas.

Figure 4:
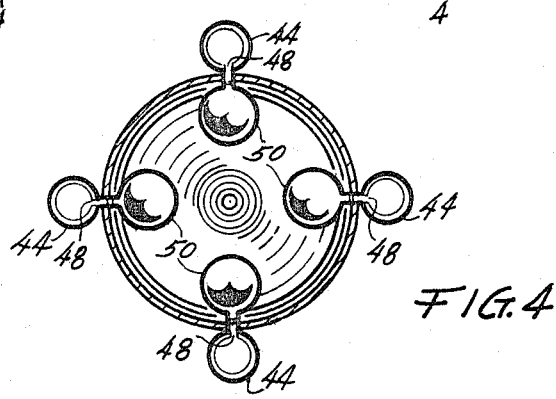
FIG. 4 is a sectional view of the embodiment of FIG. 3 taken along lines 4—4.

In the embodiment first described, generated hydrogen gas was directed towards and in to the capsule. However, in this embodiment of the invention, which may better be understood with the aid of FIG. 4, the generated hydrogen gas from each of the generators is coupled by means of longitudinal slots into cooperating elastic containers 50 within container 40. As a result of the continuing generation of hydrogen, each of containers 50 is caused to expand and thereby occupy an increased volume within container 40. It can readily be understood that during this operation a volume of water is expelled from container 40 equal to the now increased gaseous volume provided by containers 50. It should also be noted that the explosive deconnection of coupling 46 is also operative to detach each of weights 48 from container 40. As a result, a net buoyancy is supplied to the container 40 to return the capsule to the surface of the sea. Further, note should be made of the fact that during the ascendency of the capsule 40 to the surface, during which the surrounding water pressure materially decreases, that the exposed lower end of each of generators 44 is effective to allow the excess hydrogen pressure to be bled off.

Figure 5:
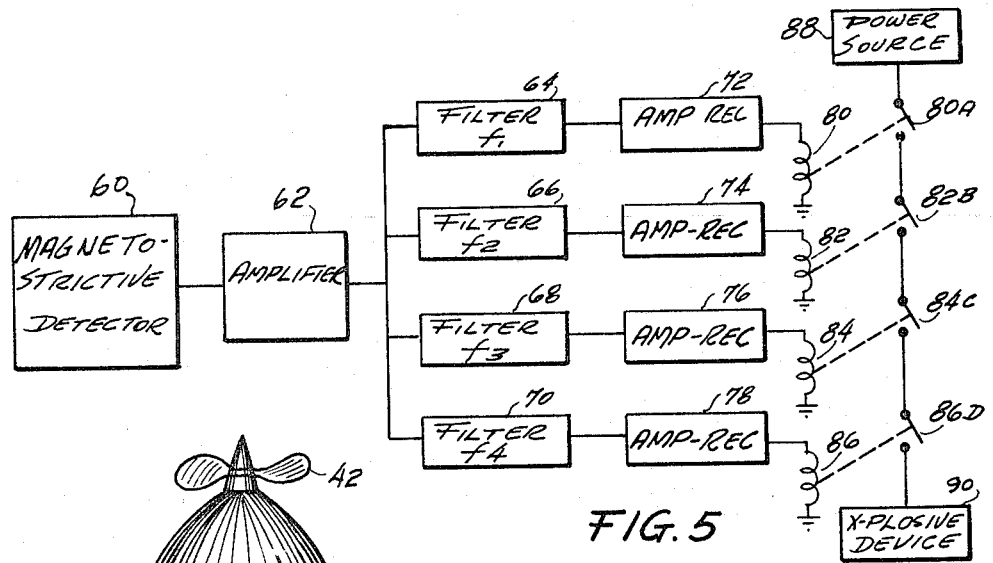
FIG. 5 is a block diagram of a preferred embodiment of a sonic detector to be incorporated within the instrument capsule.

Referring now to FIG. 5, there is illustrated in block diagram form, a sonic detector which is normally incorporated within the instrument capsule to selectively initiate a return to surface operation. As there shown, a magnostrictive detector 60, which may be a nickel piezoelectric array of crystals, detects the sonic signals provided by the sonar set 12 in the mother ship, and converts these impulses into electric signals. These signals are then increased in magnitude by bandpass amplifier 62, the output thereafter being applied in parallel to a group of filters 64, 66, 68 and 70, the number of which is determined by the characteristics of the transmitted sonic signal. Each of the filters is designed to transmit a specific specified frequency indicated in FIG. 5 as $f_1$, $f_2$, $f_3$ and $f_4$, and to attenuate all frequencies other than the frequency to which it is tuned. Next, the output of each filter is applied to the input of an amplifier-rectifier as shown, filter $f_1$ being coupled to the input of amplifier rectifier 72, the output of generator 66 being coupled to the input of amplifier-rectifier 74, etc. It can be seen that a signal transmitted by one of the filters and the corresponding amplifier-rectifier is effective to actuate a couple one of relays 80, 82, 84 and 86.

The normally opened contact of each of these relays is connected in series between a power source 88 and one or more explosive devices 90. Thus, upon the reception of the desired frequency encoded sonic signal for detector 60, the energization of relays 80 through 86 is effective to impower the explosive device, or devices, 90, and thereby initiate each of the hydrogen generators to thereby supply the necessary buoyancy to the capsule, and further, to release selected portions of the capsule which are not desired to be returned to the surface.

What has been described is a novel instrument capsule operable to be driven to extreme depths in the sea and further, to be selectively recovered therefrom. While it has long been known that essentially similar capsules may be sunk in shallow depths or even medium depths, it has not been possible, until now, to provide a recoverable capsule that can be deployed to depths measured in terms of miles. Further, a novel hydogen generator has been disclosed to provide the buoyancy necessary to lift the capsule from these extreme depths, at which several of the prior art buoyancy gases remain liquified as a result of the temperatures and pressures encountered, and where other of the normally employed buoyancy gases are relatively insufficient to provide the required net buoyancy. Additionally, the novel use of lithinum hydrid or sodium, each of which are efficiently operable at such extreme depths, has been disclosed.

It will thus be seen that the object set forth above, among those made apparent from the preceding description, are efficiently attained. Since certain changes may be made in carrying out the above method and in the construction set forth without departing from the scope of the invention, it is intended that all matter contained in the above description or shown in the accompanying drawing shall be interpreted as illustrative and not in a limiting sense.

What is claimed is:
1. An instrument capsule for obtaining measurements at extreme depths in a body of water, said extreme depths including at least 30,000 feet, comprising,
   (a) an inflatable flexible molded container, for retaining within the interior volume thereof a number of selected instruments each operable to monitor data at said extreme depths, the lower portion of said container allowing surrounding water to enter within and completely fill said interior volume;
   (b) at least one water-proof hydrogen generator containing a reactant selected form the group consisting of lithium hydrid and sodium operable to provide a supply of gaseous hydrogen when placed in contact with water;
   (c) said at least one hydrogen generator including a seal member selectively removable in response to a control signal;
   (d) means positioning said at least one hydrogen generator in gas delivering relationship with said container; and
   (e) said container further including detection means operable in response to a frequency encoded sonic signal to generate said control signal, whereby said supply of gaseous hydrogen generated by said reactant now in contact with water is effective to inflate said container, said detection means comprising a magnetostrictive detector responsive to said frequency encoded sonic signal to provide a frequency encoded electrical signal; an amplifier coupled to said detector to increase said electrical signal; a plurality of frequency selective filters each constructed to transmit only a particular frequency different from the other filters and to attenuate all other frequencies; circuit means for coupling the amplified electrical signal to all of said filters in parallel relation; a plurality of amplifier-rectifiers; circuit means for coupling each filter to separate amplifier-rectifier so as to transmit the particular electrical frequency thereto; a multiplicity of electrical relays each being coupled to one of said amplifier-rectifiers being normally open but actuable by said particular electrical frequency; a power source; an explosive device adapted to remove said seal member of said hydrogen generator on ignition; and circuit means coupling said power source through each of said electrical relays in series relation to said explosive device for detonation of same on receiving a frequency encoded signal through the circuit means.

2. The capsule of claim 1 wherein said positioning means locates said at least one hydrogen generator below said inflatable container and in spaced relationship therefrom.

3. The capsule of claim 1 wherein said positioning means secures said at least one hydrogen generator in longitudinal relationship to a side region of said contained and includes gas coupling means through the longitudinal side region into said interior volume.

References Cited by the Examiner
UNITED STATES PATENTS

| | | | |
|---|---|---|---|
| 2,368,953 | 2/1945 | Walsh | 340—5 |
| 2,977,569 | 3/1961 | Harris | 340—5 |
| 3,098,441 | 7/1963 | Amundson et al. | 102—13 |
| 3,138,778 | 6/1964 | Dulin | 340—15 |

FERGUS S. MIDDLETON, *Primary Examiner.*
MILTON BUCHLER, *Examiner.*
T. MAJOR, *Assistant Examiner.*